United States Patent
Schultes et al.

(10) Patent No.: US 7,695,813 B2
(45) Date of Patent: Apr. 13, 2010

(54) CORE AND SHELL PARTICLE FOR MODIFYING IMPACT RESISTANCE OF A MOULDABLE POLY (METH) ACRYLATE MATERIAL

(75) Inventors: Klaus Schultes, Wiesbaden (DE); Reiner Mueller, Biebesheim (DE); Andreas Spiess, Dieburg (DE); Klaus Albrecht, Mainz (DE); Werner Hoess, Griesheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 786 days.

(21) Appl. No.: 10/539,509

(22) PCT Filed: Oct. 18, 2003

(86) PCT No.: PCT/EP03/11541

§ 371 (c)(1), (2), (4) Date: Dec. 7, 2005

(87) PCT Pub. No.: WO2004/056892

PCT Pub. Date: Jul. 8, 2004

(65) Prior Publication Data
US 2006/0147714 A1 Jul. 6, 2006

(30) Foreign Application Priority Data
Dec. 19, 2002 (DE) ................. 102 60 065

(51) Int. Cl.
B32B 5/16 (2006.01)
(52) U.S. Cl. ................. 428/407; 523/201; 523/202; 523/220
(58) Field of Classification Search ................. 428/403, 428/407; 523/201, 202, 220
See application file for complete search history.

(56) References Cited

U.S. PATENT DOCUMENTS

| 3,793,402 | A | | 2/1974 | Owens |
| 4,375,532 | A | * | 3/1983 | Baer ........................... 525/310 |
| 4,513,118 | A | | 4/1985 | Suetterlin et al. |
| 4,521,568 | A | | 6/1985 | Mori et al. |
| 4,543,383 | A | | 9/1985 | Heil et al. |
| 4,833,221 | A | | 5/1989 | Albrecht |
| 5,110,877 | A | | 5/1992 | Hoess et al. |
| 5,155,172 | A | | 10/1992 | Siol et al. |
| 5,219,931 | A | | 6/1993 | Siol et al. |
| 5,229,209 | A | * | 7/1993 | Gharapetian et al. ........ 428/403 |
| 5,242,982 | A | * | 9/1993 | Oshima et al. .............. 525/286 |
| 5,270,397 | A | | 12/1993 | Rhein et al. |
| 5,280,073 | A | | 1/1994 | Siol et al. |
| 5,286,801 | A | | 2/1994 | Besecke et al. |
| 5,393,836 | A | | 2/1995 | Niessner et al. |
| 5,475,055 | A | | 12/1995 | Deckers et al. |
| 5,548,033 | A | | 8/1996 | Vetter et al. |
| 5,652,316 | A | | 7/1997 | May et al. |
| 5,705,189 | A | | 1/1998 | Lehmann et al. |
| 5,726,245 | A | | 3/1998 | Numrich et al. |
| 6,040,387 | A | | 3/2000 | Albrecht et al. |
| 6,172,135 | B1 | * | 1/2001 | Fraser et al. ................. 523/201 |
| 6,228,938 | B1 | | 5/2001 | Eichenauer et al. |

(Continued)

FOREIGN PATENT DOCUMENTS

DE 41 21 652 1/1993

(Continued)

OTHER PUBLICATIONS

U.S. Appl. No. 10/575,477, filed Apr. 12, 2006, Wicker, et al.

(Continued)

Primary Examiner—H. (Holly) T. Le
(74) Attorney, Agent, or Firm—Oblon, Spivak, McClelland, Maier & Neustad, L.L.P.

(57) ABSTRACT

The present invention relates to a core-shell particle which has a core, a first shell and, where appropriate, a second shell, where:
i) the core encompasses, based on its total weight, at least 75.0% by weight of (meth)acrylate repeat units;
ii) the first shell has a glass transition temperature below 30° C.;
iii) the second shell present where appropriate encompassed, based on its total weight, at lest 75.0% by weight of (meth) acrylate repeat units;
iv) the first shell encompasses, based on its total weight, the following constituents;
E) from 92.0 to 98.0% by weight of (meth)acrylate repeat units and
F) from 2.0 to 8.0% by weight of styrenic repeat units of the general formula (I)

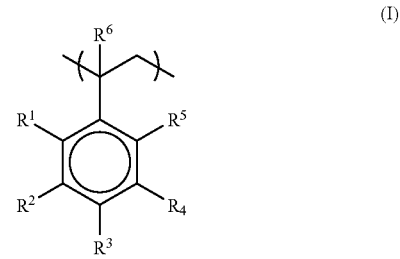

(I)

where the radicals $R^1$ to $R^6$ are defined according to the Description and the percentages by weight of E) and F) give a total of 100.0% by weight,
v) the radius of the core-shell particle inclusive of any second shell present, measured by the Coulter method, is in the range from above 160.0 to 240.0 nm;
a process for preparing core-shell particles, to a moulding composition comprising core-shell particles, and to the use thereof.

10 Claims, No Drawings

U.S. PATENT DOCUMENTS

| | | | |
|---|---|---|---|
| 6,287,470 | B1 | 9/2001 | Vetter et al. |
| 6,355,712 | B1 | 3/2002 | Schultes et al. |
| 6,576,255 | B1 | 6/2003 | Petereit et al. |
| 6,613,871 | B2 | 9/2003 | Hoess et al. |
| 6,765,046 | B1 | 7/2004 | Numrich et al. |
| 6,803,416 | B2 | 10/2004 | Schultes et al. |
| 6,809,163 | B2 | 10/2004 | Schultes et al. |
| 6,890,993 | B2 * | 5/2005 | Schultes et al. ............. 525/209 |
| 6,998,140 | B2 | 2/2006 | Meier et al. |
| 7,046,952 | B2 | 5/2006 | Kurotori et al. |
| 7,179,852 | B2 * | 2/2007 | Schultes et al. ............. 523/201 |
| 7,291,394 | B2 * | 11/2007 | Winkler et al. ............. 428/403 |
| 7,605,193 | B2 * | 10/2009 | Schultes et al. ............. 523/201 |
| 2002/0160042 | A1 | 10/2002 | Petereit et al. |
| 2004/0030046 | A1 | 2/2004 | Schultes et al. |
| 2004/0104501 | A1 | 6/2004 | Petereit et al. |
| 2004/0116567 | A1 | 6/2004 | Schmitt et al. |
| 2005/0065224 | A1 | 3/2005 | Menzler et al. |
| 2005/0080188 | A1 | 4/2005 | Schultes et al. |
| 2005/0124761 | A1 | 6/2005 | Schultes et al. |
| 2005/0152977 | A1 | 7/2005 | Petereit et al. |
| 2005/0267250 | A1 | 12/2005 | Theil et al. |
| 2006/0121248 | A1 | 6/2006 | Lorenz et al. |
| 2006/0175735 | A1 | 8/2006 | Hoess et al. |
| 2007/0066708 | A1 | 3/2007 | Goldacker et al. |
| 2007/0122624 | A1 | 5/2007 | Schultes et al. |
| 2007/0123610 | A1 | 5/2007 | Schultes et al. |
| 2007/0197703 | A1 | 8/2007 | Neuhäuser et al. |
| 2007/0222117 | A1 | 9/2007 | Hoess et al. |
| 2007/0276093 | A1 | 11/2007 | Schultes et al. |
| 2008/0242782 | A1 | 10/2008 | Hager et al. |

FOREIGN PATENT DOCUMENTS

| | | |
|---|---|---|
| DE | 41 36 993 | 5/1993 |
| EP | 0 542 036 | 5/1993 |
| EP | 0 576 960 | 1/1994 |
| EP | 0 828 772 | 3/1998 |
| WO | 96/37531 | 11/1996 |

OTHER PUBLICATIONS

U.S. Appl. No. 10/575,929, filed Apr. 14, 2006, Schultes, et al.
U.S. Appl. No. 11/970,190, filed Jan. 7, 2008, Schultes, et al.
U.S. Appl. No. 12/094,277, filed May 20, 2008, Schultes, et al.
U.S. Appl. No. 11/748,874, filed May 15, 2007, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/817,407, filed Aug. 30, 2007, Hoess, et al.
U.S. Appl. No. 11/913,325, filed Nov. 1, 2007, Schwarz-Barac, et al.
U.S. Appl. No. 60/831,222, filed Jul. 17, 2006, Hager, et al.
U.S. Appl. No. 12/436,809, filed May 7, 2009, Schultes, et al.

* cited by examiner

CORE AND SHELL PARTICLE FOR MODIFYING IMPACT RESISTANCE OF A MOULDABLE POLY (METH) ACRYLATE MATERIAL

The present invention relates to core-shell particles, to a process for the preparation of core-shell particles, to moulding compositions comprising core-shell particles, and to the use thereof. The present invention particularly relates to core-shell particles which can be used for the impact-modification of poly(meth)acrylate moulding compositions. It has long been known that the notched impact strength of moulding compositions, in particular of poly(meth)acrylate moulding compositions, can be improved by adding, to the moulding composition, a suitable amount of what are known as impact modifiers. The use of core-shell particles and/or core-shell-shell particles for this purpose has become established industrially. These generally have an elastomeric phase, where in the case of a core-shell particle with one shell the core mostly represents the elastomeric phase, and in the case of a core-shell particle with two shells the first shell grafted on to the core mostly represents the elastomeric phase.

By way of example, U.S. Pat. No. 3,793,402 discloses toughened moulding compositions, in particular based on poly(meth)acrylate, which comprise from 90 to 4% by weight of a multistage core-shell particle with a hard core, an elastomeric first shell and a hard second shell. Typical main constituents of the core and of the second shell are alkyl methacrylates having from 1 to 4 carbon atoms in the alkyl radical, in particular methyl methacrylate. The first shell is substantially composed of butadiene, substituted butadienes and/or alkyl acrylates having from 1 to 8 carbon atoms in the alkyl radical. However, it may also contain from 0 to 49.9% by weight, in particular from 0.5 to 30% by weight, of copolymerizable monomer units, such as copolymerizable, monoethylenically unsaturated monomer units. According to U.S. Pat. No. 3,793,402, the presence here of from 10 to 25% by weight of copolymerizable, monoethylenically unsaturated monomer units, in particular of styrene, is very particularly advantageous. The overall diameter of the core-shell particles is in the range from 100 to 300 nm.

Similarly, the German Patent Application DE 41 21 652 A1 describes impact modifiers for thermoplastics, such as polymethyl methacrylate, composed of an at least three-phase emulsion polymer, comprising A) a hard core composed of a crosslinked homo- or copolymer of ethylenically unsaturated monomers capable of free-radical polymerization;
B) an elastomer phase generated in the presence of the core material and having a glass transition temperature not above 10° C., and composed of
  a) an alkyl ester of acrylic acid having from 1 to 8 carbon atoms in the alkyl radical;
  b) at least one crosslinking comonomer having two or more polymerizable double bonds in the molecule;
  c) arylalkyl acrylate or arylalkyl methacrylate;
  d) a hard phase generated in the presence of the elastomer phase and composed of a homo- or copolymer of ethylenically unsaturated monomers capable of free-radical polymerization, its glass transition temperature being at least 50° C.

A moulding composition (Example 3) cited by way of example in that publication has an Izod notched impact strength of $6.2 \text{ kJ/m}^2$ at room temperature, $4.7 \text{ kJ/m}^2$ at $-10°$ C., and $3.7 \text{ kJ/m}^2$ at $-20°$ C. The Vicat softening point of that moulding composition is 97° C.

The German Patent Application DE 41 36 993 A1 discloses impact-modified moulding compositions which comprise from 10 to 96% by weight of a polymer based on polymethyl methacrylate and from 4 to 90% by weight of a multistage core-shell-shell particle, using, for the preparation of the core and, respectively, of the second shell, a monomer mixture composed substantially of methyl methacrylate. The monomer mixture for the first shell encompasses from 60 to 89.99% by weight of alkyl acrylate having from 1 to 20 carbon atoms in the alkyl radical and/or cycloalkyl acrylates having from 5 to 8 carbon atoms in the cycloalkyl radical and from 10 to 39.99% by weight of phenylalkyl acrylate having from 1 to 4 carbon atoms in the alkyl radical, and also, where appropriate, other constituents. The average particle diameter of the core-shell-shell particles is in the range from 50 to 1000 nm, in particular in the range from 150 to 400 nm.

The European Patent EP 0 828 772 B1 describes the impact-modification of poly(meth)acrylates by multi-stage core-shell particles which are composed of a core, a first shell and, where appropriate, a second shell, and are free from vinylically unsaturated compounds having at least two equally reactive double bonds. In this case, the core comprises a first (meth)acrylic polymer. The first shell comprises a polymer which has a low glass transition temperature and which encompasses from 0 to 25% by weight, in particular from 5 to 26% [sic] by weight, of a styrenic monomer and from 75 to 100% by weight of a (meth)acrylic monomer which forms a homopolymer with a glass transition temperature of from $-75$ to $-5°$ C. The second shell present where appropriate comprises a second (meth)acrylic polymer which may be identical with the first (meth)acrylic polymer or may differ therefrom. The overall diameter of the core-shell particles is in the range from 250 to 320 nm.

The emulsion polymers, suspension polymers are also occasionally used for the impact-modification of moulding compositions. The rubber here, for example grafted with polymethyl methacrylate, has relatively fine distribution in the matrix of the moulding composition, for example polymethyl methacrylate. The elastomeric phase is composed of a mostly crosslinked copolymer with a low glass transition temperature below 25° C., which usually contain [sic], as main component, alkyl acrylate units having from 1 to 8 carbon atoms in the alkyl radical, in particular butyl acrylate units. Use is also occasionally made of polybutadiene or polybutadiene copolymers as tough phase.

Although it is true that use of the impact modifiers described above can achieve a significant improvement in notch impact strength, for a wide variety of applications this is still not fully satisfactory. For example, impact-modification at low temperature in particular requires a relatively large amount of these impact modifiers, which in turn leads to significant impairment of the other properties important for applications of the moulding composition, in particular modulus of elasticity, melt viscosity, Vicat point and die swell.

Industry therefore demands impact modifiers which permit sufficient improvement in the notched impact strength of a moulding composition, in particular at low temperature, using minimum amounts of impact modifier, without any noticeable associated impairment in the other important properties of the moulding composition, in particular modulus of elasticity, melt viscosity, Vicat point and die swell. The moulding composition here is intended to have a Izod notched impact strength which is preferably above $6.0 \text{ kJ/m}^2$ at 23° C., a modulus of elasticity which is preferably above 1450 MPa, a melt viscosity which is preferably above 2000 Pa s and advantageously below 4500 Pa s, a Vicat point which is preferably above 93° C. and a die swell which is preferably in the range from 0 to 20%.

In light of the prior art, it was then a object of the present invention to provide, for moulding compositions, in particular for poly(meth)acrylate moulding compositions, impact modifiers which permit improvement of the notched impact strength of moulding compositions, in particular at low temperature, with no noticeable associated impairment of the other moulding composition properties important for applications, in particular modulus of elasticity, melt viscosity, Vicat point and die swell. The moulding compositions are intended to have an Izod notched impact strength which is preferably above 6.0 kJ/m$^2$ at 23° C., a modulus of elasticity which is preferably above 1450 MPa, a melt viscosity which is preferably above 2000 Pa s and advantageously below 4500 Pa s, a Vicat point which is preferably above 93° C. and a die swell which is preferably in the range from 0 to 20%.

Another object of the present invention was to be found in the provision of a process which can prepare impact modifiers of the invention particles and which can be carried out simply, on an industrial scale, and at low cost.

Another object on which the present invention was based was to provide application sectors and possible uses for the impact modifiers of the invention.

A core-shell particle having the presently features achieves these objects, and also achieves other objects which, although not explicitly mentioned, are readily derivable or producible from the circumstances discussed in the above introduction. The process claim protects a preferred mode of preparation of the core-shell particle of the invention. Also claimed are impact-modified poly(meth)acrylate moulding compositions which comprise core-shell particles of the invention, and preferred application sectors for these moulding compositions.

The provision of a core-shell particle which is composed of a core, of a first shell, and, where appropriate, of a second shell, where:

i) the core encompasses, based on its total weight, at least 75.0% by weight of (meth)acrylate repeat units;

ii) the first shell has a glass transition temperature below 30° C.;

iii) the second shell present where appropriate encompasses, based on its total weight, at least 75.0% by weight of (meth)acrylate repeat units;

iv) the first shell encompasses, based on its total weight, the following constituents;

E) from 92.0 to 98.0% by weight of (meth)acrylate repeat units and

F) from 2.0 to 8.0% by weight of styrenic repeat units of the general formula (I)

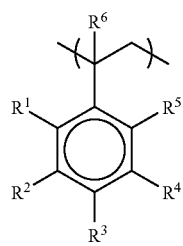

(I)

where each of the radicals $R^1$ to $R^5$, independently of the other, is hydrogen, a halogen, a $C_1$-$C_6$-alkyl group or a $C_2$-$C_6$ alkenyl group and the radical $R^6$ is hydrogen or an alkyl group having from 1 to 6 carbon atoms, where the percentages by weight of E) and F) give a total of 100.0% by weight, v) the radius of the core-shell particle inclusive of any second shell present, measured by the Coulter method, is in the range from above 160.0 to 240.0 nm, is a method which could not readily be foreseen for successfully obtaining an impact modifier for moulding compositions, in particular for poly(meth)acrylate moulding compositions, where the impact modifier permits an improvement in the notched impact strength of moulding compositions, in particular at low temperatures, without any noticeable associated impairment of the other moulding compositions properties important for the application, in particular modulus of elasticity, melt viscosity, Vicat point and die swell. According to the invention, particularly suitable moulding compositions here have an Izod notched impact strength which is preferably above 6.0 kJ/m$^2$ at 23° C., a modulus of elasticity which is preferably above 1450 MPa, a melt viscosity which is preferably above 2000 Pa s and advantageously below 4500 Pa s, a Vicat point which is preferably above 93° C. and a die swell which is preferably in the range from 0 to 20%.

A series of important advantages can be achieved at the same time by using the core-shell particles of the invention. These include:

⇒ By using the core-shell particles of the invention, it is possible to obtain moulding compositions with significantly improved notched impact strength values, in particular at low temperatures below 0° C., advantageously moulding compositions with an Izod notched impact strength above 3.7 kJ/m$^2$ at −20° C. to ISO 180.

⇒ When comparison is made with conventional impact modifiers, significantly smaller amounts of the core-shell particles of the invention are sufficient to obtain moulding compositions with comparable notched impact strengths at low temperatures, in particular at −20° C.

⇒ It is possible to prepare the core-shell particle of the invention simply, on an industrial scale, and at low cost.

⇒ The moulding compositions impact-modified in the inventive manner feature a significantly improved property profile at low temperatures, in particular at −20° C. This makes them useful for applications at low temperatures, in particular at temperatures below 0° C.

The present invention provides core-shell particles which have a core, a first shell and, where appropriate, a second shell. Furthermore, the core-shell particles of the invention may, where appropriate, encompass further shells, although core-shell particles which have proven particularly successful for the purposes of the present invention are those which are composed of a core, a first shell and preferably a second shell.

The term "core-shell particle" is very well known from the prior art and, for the purposes of the present invention, denotes polymers which are obtainable by multistage emulsion polymerization. This process has long been known in the prior art and is explained and described by way of example in Houben-Weyl, Volume E20, Part 2 (1987), pp. 1150 et seq. The person skilled in the art can also find further valuable information in the publications U.S. Pat. No. 3,793,402, DE 41 21 652 A1, DE 41 36 993 A1, EP 828 772 A1, the disclosure of which is expressly incorporated herein by way of reference.

For the purposes of the present invention, the core has at least 75% by weight of (meth)acrylate repeat units, based on its total weight.

For the purposes of the present invention, the wording "(meth)acrylates" here denote [sic] acrylates, methacrylates and mixtures of the two. They therefore encompass compounds which have at least one group of the following formula

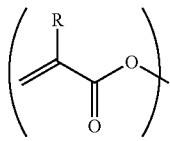

where R is hydrogen or a methyl radical. They include in particular alkyl acrylates and/or alkyl methacrylates.

The core preferably encompasses, based in each case on its total weight,

A) from 50.0 to 99.9% by weight, advantageously from 60.0 to 99.9% by weight, preferably from 75.0 to 99.9% by weight, particularly preferably 80.0 to 99.0% by weight, particularly from 85.0 to 99.0% by weight, of alkyl methacrylate repeat units having from 1 to 20, preferably from 1 to 12, in particular from 1 to 8 carbon atoms in the alkyl radical, B) from 0.0 to 40.0% by weight, preferably from 0.0 to 24.9% by weight, advantageously from 1.0 to 29.9% by weight, in particular from 1.0 to 14.9% by weight, of alkyl acrylate repeat units having from 1 to 20, preferably from 1 to 12, particularly preferably from 1 to 8, in particular from 1 to 4, carbon atoms in the alkyl radical, C) from 0.1 to 2.0% by weight of crosslinking repeat units and D) from 0.0 to 8.0% by weight of styrenic repeat units of the general formula (I)

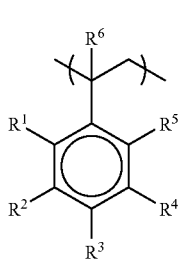

where the stated percentages by weight preferably give a total of 100.0% by weight.

These compounds A), B), C) and D) are naturally different from one another, and in particular for compounds A) and B) comprise no crosslinking monomers C).

Each of the radicals $R^1$ to $R^5$ is, independently of the others, hydrogen, a halogen, in particular fluorine, chlorine or bromine, or an alkyl group having from 1 to 6 carbon atoms, preferably hydrogen. The radical $R^6$ is hydrogen or an alkyl group having from 1 to 6 carbon atoms, preferably hydrogen. Particularly suitable alkyl groups having from 1 to 6 carbon atoms are methyl, ethyl, n-propyl, isopropyl, n-butyl, sec-butyl, tert-butyl, n-pentyl, n-hexyl groups and cyclopentyl and cyclohexyl groups.

In this way styrenic repeat units of the general formula (I) encompass repeat structural units which are obtainable by polymerization of monomers of the general formula (Ia).

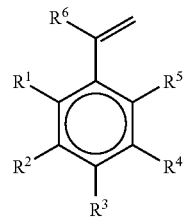

Suitable monomers of the general formula (Ia) in particular encompass styrene, substituted styrenes having an alkyl substituent in the side chain, for example α-methylstyrene and α-ethylstyrene, substituted styrenes having an alkyl substituent on the ring, for example vinyltoluene and p-methylstyrene, halogenated styrenes, for example monochlorostyrenes, dichlorostyrenes, tribromostyrenes and tetrabromostyrenes.

The abovementioned alkyl methacrylate repeat units (A) comprise repeat structural units which are obtainable via polymerization of esters of methacrylic acid. Suitable esters of methacrylic acid encompass in particular methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates, for example cyclopentyl methacrylate, cyclohexyl methacrylate, 3-vinyl-2-butylcyclohexyl methacrylate, cycloheptyl methacrylate, cyclooctyl methacrylate, bornyl methacrylate and isobornyl methacrylate.

In one particularly preferred embodiment of the present invention, the core comprises, based on its total weight, at least 50% by weight, advantageously at least 60% by weight, preferably at least 75% by weight, in particular at least 85% by weight, of methyl methacrylate repeat units.

The abovementioned alkyl acrylate repeat units (B) comprise repeat structural units which are obtainable via polymerization of esters of acrylic acid. Suitable esters of acrylic acid encompass in particular methyl acrylate ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, ethylhexyl acrylate, nonyl acrylate, 2-methyloctyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates, for example cyclopentyl acrylate, cyclohexyl acrylate, 3-vinyl-2-butylcyclohexyl acrylate, cycloheptyl acrylate, cyclooctyl acrylate, bornyl acrylate and isobornyl acrylate.

The abovementioned crosslinking repeat units (C) comprise repeat structural units which are obtainable via polymerization of crosslinking monomers. Suitable crosslinking monomers encompass in particular all of the compounds which are capable, under the present polymerization conditions, of bringing about crosslinking. These include in particular (a) Difunctional (meth)acrylates, preferably
compounds of the general formula:

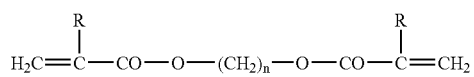

where R is hydrogen or methyl and n is a positive whole number greater than or equal to 2, preferably from 3 to 20, in particular di(meth)acrylates of propanediol, of butanediol, of hexanediol, of octanediol, of nonanediol, of decanediol, and of eicosanediol;
Compounds of the general formula:

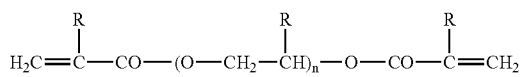

where R is hydrogen or methyl and n is a positive whole number from 1 to 14, in particular di(meth)acrylate of ethylene glycol, of diethylene glycol, of triethylene glycol, of tetraethylene glycol, of dodecaethylene glycol, of tetradecaethylene glycol, of propylene glycol, of dipropyl glycol, and of tetradecapropylene glycol.
Glycerol di(meth)acrylate, 2,2'-bis[p-(γ-methacryloxy-β-hydroxypropoxy) phenylpropane] or bis-GMA, biphenol [sic] A dimethacrylate, neopentyl glycol di(meth)acrylate, 2,2'-di(4-methacryloxypolyethoxyphenyl)propane having from 2 to 10 ethoxy groups per molecule and 1,2-bis(3-methacryloxy-2-hydroxypropoxy)butane.

(b) Tri- or polyfunctional (meth)acrylates, in particular trimethylolpropane tri(meth)acrylate and pentaerythritol tetra(meth)acrylate.

(c) Graft crosslinking agents having at least two C—C double bonds of differing reactivity, in particular allyl methacrylate and allyl acrylate;

(d) aromatic crosslinking agents, in particular 1,2-divinylbenzene, 1,3-divinylbenzene and 1,4-divinylbenzene.

The manner of selection of the proportions by weight of the constituents A) to D) of the core is preferably such that the core has a glass transition temperature Tg of at least 10° C. preferably of at least 30° C. The glass transition temperature Tg of the polymer here can be determined in a known manner by differential scanning calorimetry (DSC). The glass transition temperature Tg may also be approximated by means of the Fox equation. According to Fox T. G., Bull. Am. Physics Soc. 1, 3, p. 123 (1956):

$$\frac{1}{Tg} = \frac{x_1}{Tg_1} + \frac{x_2}{Tg_2} + \ldots + \frac{x_n}{Tg_n}$$

where $x_n$ is the proportion by weight (% by weight/100) of the monomer n and $Tg_n$ is the glass transition temperature in kelvins of the homopolymer of the monomer n. The person skilled in the art may obtain further useful information from Polymer Handbook $2^{nd}$ Edition, J. Wiley & Sons, New York (1975), which gives Tg values for the homopolymers most commonly encountered.

The first shell of the core-shell particles of the invention has a glass transition temperature below 30° C., preferably below 10° C., in particular in the range from 0 to −75° C. The glass transition temperature Tg of the polymer here may be determined, as mentioned above, by means of differential scanning colorimetry (DSC) and/or approximated by means of the Fox equation.

The first shell encompasses, based on its total weight, the following constituents:
E) from 92.0 to 98.0% by weight of (meth)acrylate repeat units and
F) from 2.0 to 8.0% by weight of styrenic repeat units of the general formula (I), where the percentages by weight give a total of 100% by weight.

For the purposes of one particularly preferred embodiment of the present invention, the first shell encompasses
E-1) from 90.0 to 97.9% by weight of alkyl acrylate repeat units having from 3 to 8 carbon atoms in the alkyl radical and/or alkyl methacrylate repeat units having from 7 to 14 carbon atoms in the alkyl radical, in particular butyl acrylate repeat units and/or dodecyl methacrylate repeat units, and
E-2) from 0.1 to 2.0% by weight of crosslinking repeat units,
F) from 2.0 to 8.0% by weight of styrenic repeat units of the general formula (I), where the parts by weight preferably give a total of 100.0 parts by weight.

These compounds E-1), E-2) and F) naturally differ from one another, and in particular the compounds E-1) comprise no crosslinking monomers E-2).

The second shell which may be present where appropriate encompasses, based on its total weight, at least 75% by weight of (meth)acrylate repeat units. It preferably contains
G) from 50.0 to 100.0% by weight, advantageously from 60.0 to 100.0% by weight, particularly preferably from 75.0 to 100.0% by weight, in particular from 85.0 to 99.5% by weight, of alkyl methacrylate repeat units having from 1 to 20, preferably from 1 to 12, in particular from 1 to 8, carbon atoms in the alkyl radical,
H) from 0.0 to 40.0% by weight, preferably from 0.0 to 25.0% by weight and in particular from 0.1 to 15.0% by weight, of alkyl acrylate repeat units having from 1 to 20, preferably from 1 to 12, in particular from 1 to 8, carbon atoms in the alkyl radical,
I) from 0.0 to 10.0% by weight, preferably from 0.0 to 8.0% by weight, of styrenic repeat units of the general formula (I), where the stated percentages by weight preferably give a total of 100.0% by weight.

In one particularly preferred embodiment of the present invention, the second shell comprises, based on its total weight, at least 50% by weight, advantageously at least 60% by weight, preferably at least 75% by weight, in particular at least 85% by weight, of methyl methacrylate repeat units.

The manner of selection of constituents of the second shell is moreover advantageously such that the second shell has a glass transition temperature Tg of at least 10° C., preferably at least 30° C. The glass transition temperature Tg of the polymer here can be determined as mentioned above by differential scanning calorimetry (DSC) and/or approximated by the Fox equation.

The overall radius of the core-shell particle inclusive of any second shell present is in the range from above 160 to 240 nm, preferably in the range from 170 to 220 nm, in particular in the range from 175 to 210 nm. This overall radius is determined by the Coulter method. This method known from the literature for particle size determination is based on the measurement of the electrical resistance, which changes in a characteristic manner when particles pass through a narrow measuring aperture. Further details may be found by way of example in Nachr. Chem. Tech. Lab. 43, 553-566 (1995).

For the purposes of the present invention, furthermore, it has proven particularly advantageous if, based in each case on its total weight,
i) the proportion of the core is from 5.0 to 50.0% by weight, preferably from 15.0 to 50.0% by weight, advantageously from 25.0 to 45.0% by weight, in particular from 30.0 to 40.0% by weight,
ii) the proportion of the first shell is from 20.0 to 75.0% by weight, preferably from 30.0 to 60.0% by weight, advantageously from 35.0 to 55.0% by weight, in particular from 40.0 to 50% by weight, and
iii) the proportion of the second shell is from 0.0 to 50.0% by weight, preferably from 5.0 to 40.0% by weight, advantageously from 10.0 to 30.0% by weight, in particular from 15.0 to 25.0% by weight, where the percentages by weight preferably give a total of 100.0% by weight.

The core-shell particles of the invention may be prepared in a manner known per se, for example by means of multistage emulsion polymerization. This advantageously uses a method in which water and emulsifier are used to form an initial charge. This initial charge preferably comprises from 90.0 to 99.99 parts by weight of water and from 0.01 to 10.00 parts by weight of emulsifier, where the stated parts by weight advantageously give a total of 100.00 parts by weight.

The following sequence is then applied stepwise to this initial charge
b) the monomers for the core in the desired ratios are added and polymerized to a conversion of at least 85.0% by weight, preferably at least 90.0% by weight, advantageously at least 95.0% by weight, in particular at least 99% by weight, based in each case on their total weight,
c) the monomers for the first shell are added in the desired ratios and polymerized to a conversion of at least 85.0% by weight, preferably at least 90.0% by weight, advantageously at least 95.0% by weight, in particular at least 99% by weight, based in each case on the total weight thereof,
d) where appropriate, the monomers for the second shell are added in the desired ratios and polymerized to a conversion of at least 85% by weight, preferably at least. 90.0% by weight, advantageously at least 95.0% by weight, in particular at least 99% by weight, based in each case on the total weight thereof.

For the purposes of the invention, polymers here are compounds whose molecular weight is at least 10 times that of the respective starting compound A) to I), known as the monomer.

The progress of the polymerization reaction into each step may be monitored in a known manner, for example gravimetrically or by means of gas chromatography.

According to the present invention, the polymerization in steps b) to d) is preferably carried out at a temperature in the range from 0 to 120° C., preferably in the range from 30 to 100° C.

Polymerization temperatures which have proven very particularly advantageous here are in the range from above 60 to below 90° C., advantageously in the range from above 70 to below 85° C., preferably in the range from above 75 to below 85° C.

The initiation takes place using the initiators commonly used for emulsion polymerization. Examples of suitable organic initiators are hydroperoxides, such as tert-butyl hydroperoxide or cumene hydroperoxide. Suitable inorganic initiators are hydrogen peroxide and the alkali metal and ammonium salts of peroxodisulphuric acid, in particular sodium peroxodisulphate and potassium peroxodisulphate. Suitable redox initiator systems by way of example are combinations of tertiary amines with peroxides or sodium disulfite and peroxodisulfates of alkali metals and of ammonium, in particular sodium peroxodisulfate and potassium peroxodisulfate, or particularly preferably peroxides.

Further details may be found in the technical literature, in particular H. Rauch-Puntigam, Th. Volker, "Acryl- und Methacrylverbindungen", [Acrylic and methacrylic compounds], Springer, Heidelberg, 1967 or Kirk-Othmer, Encyclopaedia of Chemical Technology, Vol. 1, pp. 386 et seq., J. Wiley, New York, 1978. For the purposes of the present invention, the use of organic and/or inorganic initiators is particularly preferred.

The initiators mentioned may be used either individually or else in a mixture. Their amount used is preferably from 0.05 to 3.0% by weight, based on the total weight of the monomers for the respective stage. It is also possible and preferable to carry out the polymerization using a mixture of various polymerization initiators of different half-lifetime, in order to keep the supply of free radicals constant during the course of the polymerization or at various polymerization temperatures.

The reaction mixture is stabilized preferably by means of emulsifiers and/or protective colloids. Preference is given to stabilization by emulsifiers, in order to obtain low dispersion viscosity. The total amount of emulsifier is preferably from 0.1 to 5% by weight, in particular from 0.5 to 3% by weight, based on the total weight of the monomers A) to I). Particularly suitable emulsifiers are anionic or non-ionic emulsifiers or mixtures of these, in particular:
alkyl sulphates, preferably those having from 8 to 18 carbon atoms in the alkyl radical, alkyl and alkylaryl ether sulphates having from 8 to 18 carbon atoms in the alkyl radical and from 1 to 50 ethylene oxide units;
sulphonates, preferably alkylsulphonates having from 8 to 18 carbon atoms in the alkyl radical, alkylarylsulphonates having from 8 to 18 carbon atoms in the alkyl radical, esters and half-esters of sulphosuccinic acid with monohydric alcohols or alkylphenols having from 4 to 15 carbon atoms in the alkyl radical; where appropriate, these alcohols or alkylphenols may also have been ethoxylated with from 1 to 40 ethylene oxide units;
partial esters of phosphoric acid and the alkali metal and ammonium salts of these, preferably alkyl and alkylaryl phosphates having from 8 to 20 carbon atoms in the alkyl and, respectively, alkylaryl radical and from 1 to 5 ethylene oxide units;
alkyl polyglycol ethers, preferably having from 8 to 20 carbon atoms in the alkyl radical and from 8 to 40 ethylene oxide units;
alkylaryl polyglycol ethers, preferably having from 8 to 20 carbon atoms in the alkyl and, respectively, alkylaryl radical and from 8 to 40 ethylene oxide units;
ethylene oxide-propylene oxide copolymers, preferably block copolymers, advantageously having from 8 to 40 ethylene oxide and, respectively, propylene oxide units.

According to the invention, preference is given to mixtures composed of anionic emulsifier and of non-ionic emulsifier.

Mixtures which have proven very particularly successful here are those composed of an ester or half-ester of sulphosuccinic acid with monohydric alcohols or alkylphenols having from 4 to 15 carbon atoms in the alkyl radical, as anionic emulsifier, and of an alkyl polyglycol ether, preferably having from 8 to 20 carbon atoms in the alkyl radical and from 8 to 40 ethylene oxide units, as non-ionic emulsifier, in a ratio of from 8:1 to 1:8 by weight.

Where appropriate, the emulsifiers may also be used in a mixture with protective colloids. Suitable protective colloids encompass, inter alia, partially hydrolysed polyvinyl acetates, polyvinylpyrrolidones, carboxymethyl-, methyl-, hydroxyethyl-, hydroxypropyl-cellulose, starches, proteins, poly(meth)acrylic acid, poly(meth)acrylamide, polyvinylsulphonic acids, melamineformaldehydesulphonates, naphthaleneformaldehydesulphonates, styrene-maleic acid copolymers and vinyl ether-maleic acid copolymers. If use is made of protective colloids, the amount preferably used of these is from 0.01 to 1.0% by weight, based on the total amount of the monomers A) to I). The protective colloids may be used to form an initial charge prior to the start of the polymerization, or may be metered in.

The initiator may be used to form an initial charge or may be metered in. Another possibility, furthermore, is use of a portion of the initiator to form an initial charge and metering-in of the remainder.

The polymerization is preferably initiated by heating the reaction mixture to the polymerization temperature and by metering-in of the initiator, preferably in aqueous solution. The feeds of emulsifier and monomers may be separate or take the form of a mixture. If mixtures composed of emulsifier and monomer are metered in, the procedure comprises premixing emulsifier and monomer in a mixer installed upstream of the polymerization reactor. It is preferable for the remainder of emulsifier and the remainder of monomer which are not used to form an initial charge to be metered in separately from one another after the start of the polymerization. The feed is preferably begun from 15 to 35 minutes after the start of the polymerization.

For the purposes of the present invention, furthermore, it is particularly advantageous for the initial charge to comprise what is known as a "seed latex", which is preferably obtainable by polymerization of alkyl (meth)acrylates and moreover advantageously has a particle radius in the range from 3.0 to 20.0 nm. These small radii may be calculated after a defined polymerization onto the seed latex, during which a shell is built up around the seed latex, and measuring the radii of the resultant particles by the Coulter method. This method of particle size determination, known from the literature, is based on measurement of the electrical resistance, which changes in a characteristic manner when particles pass through a narrow measuring aperture. Further details may be found in Nachr. Chem. Tech. Lab. 43, 553-566 (1995), for example.

The monomer constituents of the actual core, i.e. the first composition, are added to the seed latex, preferably under conditions such that the formation of new particles is avoided. The result of this is that the polymer formed in the first stage of the process is deposited in the form of a shell around the seed latex. Similarly, the monomer constituents of the first shell material (second composition) are added to the emulsion polymer under conditions such that the formation of new particles is avoided. The result of this is that the polymer formed in the second stage is deposited in the form of a shell around the existing core. This procedure is to be repeated appropriately for each further shell.

In another preferred embodiment of the present invention, the core-shell particles of the invention are obtained by an emulsion polymerization process in which, instead of the seed latex, a long-chain aliphatic alcohol, preferably having from 12 to 20 carbon atoms, emulsified, is used to form an initial charge. In one preferred embodiment of this process, the long-chain aliphatic alcohol used comprises stearyl alcohol. Similarly to the procedure described above, the core-shell structure is obtained by stepwise addition and polymerization of the corresponding monomers, avoiding the formation of new particles. The person skilled in the art can find further details on the polymerization process in the Patent Specifications DE 3343766, DE 3210891, DE 2850105, DE 2742178 and DE 3701579.

However, for the purposes of the present invention, irrespective of the specific procedure, it has proven very particularly advantageous for the second and the third monomer mixture to be metered in as required by consumption.

The chain length, in particular of the (co)polymers of the second shell may be adjusted via polymerization of the monomer or of the monomer mixture in the presence of molecular weight regulators, in particular of the mercaptans known for this purpose, for example n-butyl mercaptan, n-dodecyl mercaptan, 2-mercaptoethanol or 2-ethylhexyl thioglycolate, pentaerythritol tetrathioglycolate; the amounts used of the molecular weight regulators generally being from 0.05 to 5% by weight, based on the monomer mixture, preferably from 0.1 to 2% by weight and particularly preferably from 0.2 to 1% by weight, based on the monomer mixture (cf., for example, H. Rauch-Puntigam, Th. Völker, "Acryl- und Methacrylverbindungen" [Acrylic and methacrylic compounds], Springer, Heidelberg, 1967; Houben-Weyl, Methoden der organischem Chemie [Methods of organic chemistry], Vol. XIV/1. p. 66, Georg Thieme, Heidelberg, 1961 or Kirk-Othmer, Encyclopaedia of Chemical Technology, Vol. 1, pp. 296 et seq., J. Wiley, New York, 1978). The molecular weight regulator used preferably comprises n-dodecyl mercaptan.

After conclusion of the polymerization, post-polymerization may be carried out for residual monomer removal, using known methods, for example using initiated post-polymerization.

Since the process of the invention is particularly suitable for preparing aqueous dispersions with high solids content above 50% by weight, based on the total weight of the aqueous dispersion, the manner of selection of the relative proportions of all of the substances is such that the total weight of the monomers, based on the total weight of the aqueous dispersion, is above 50.0% by weight, advantageously above 51.0% by weight, preferably above 52.0% by weight. The substances to be taken into account in this connection also include, besides the monomers, all of the other substances used, for example water, emulsifier, initiator, where appropriate regulators and protective colloids, etc.

The aqueous dispersions obtainable by the process of the invention feature a low coagulate content which, based on the total weight of the aqueous dispersion, is preferably less than 5.0% by weight, advantageously less than 3.0% by weight, in particular less than 1.5% by weight. In one particularly preferred embodiment of the present invention, the aqueous dispersion comprises, based on its total weight, less than 1.0% by weight, preferably less than 0.5% by weight, advantageously less than 0.25% by weight, in particular 0.10% by weight or less, of coagulate.

The term "coagulate" in this connection means water-insoluble constituents, which may preferably be filtered off by filtering the dispersion advantageously through a filter ruffle in which a No. 0.90 DIN 4188 filter fabric has been fixed.

The core-shell particle of the invention may be obtained from the dispersion for example by spray drying, freeze coagulation, precipitation by electrolyte addition or by exposure to mechanical or thermal stress, where the latter can be carried out by means of a vented extruder according to DE 27 50 682 A1 or U.S. Pat. No. 4,110,843. The process of spray drying is the most commonly used, but the other processes mentioned have the advantage that they provide at least some separation of the water-soluble polymerization auxiliaries from the polymer.

The core-shell particle of the invention serves to improve the notched impact strength of rigid thermo-plastics which are compatible with the hard phase, preferably of poly(meth) acrylate moulding compositions, in particular of polymethyl methacrylate.

The poly(meth)acrylate moulding compositions preferably comprise other polymers for suitable modification of properties. These include in particular polyacrylo-nitriles, polystyrenes, polyethers, polyesters, poly-carbonates and polyvinyl chlorides. These polymers may be used individually or as a mixture, and for the purposes of one very particularly preferred embodiment of the present invention, copolymers which are derivable from the abovementioned polymers are added to the moulding compositions. These include in particular styrene-acrylonitrile copolymers (SAN), which are preferably added to the moulding compositions in an amount of up to 45% by weight.

Particularly preferred styrene-acrylonitrile copolymers may be obtained by polymerizing mixtures which are composed of from 70.0 to 92.0% by weight of styrene from 8.0 to 30.0% by weight of acrylonitrile and from 0.0 to 22.0% by weight of other comonomers, based in each case on the total weight of the monomers to be polymerized.

From 10 to 60 parts of the impact-modifying agent are generally admixed with 100 parts of the moulding composition to be modified.

According to the invention, particularly preferred moulding composition [sic] comprise, based in each case on its total weight:
A) from 1.0 to 50.0% by weight of at least one core-shell particle according to at least one of claims 1 to 9;
B) from 1.0 to 99.0% by weight of at least one (meth)acrylic polymer,
C) from 0.0 to 45.0% by weight, preferably from 1.0 to 45% by weight, of styrene-acrylonitrile copolymers and
D) from 0.0 to 10.0% by weight of other additives where the percentages by weight give a total of 100.0% by weight.

The (meth)acrylic polymer here preferably encompasses, based in each case on its total weight,
a) from 50.0 to 100.0% by weight, advantageously from 60.0 to 100.0% by weight, particularly preferably from 75.0 to 100.0% by weight, in particular from 85.0 to 99.5% by weight, of alkyl methacrylate repeat units having from 1 to 20, preferably from 1 to 12, advantageously from 1 to 8, in particular from 1 to 4, carbon atoms in the alkyl radical,
b) from 0.0 to 40.0% by weight, preferably from 0.0 to 25.0% by weight, in particular from 0.1 to 15.0% by weight, of alkyl acrylate repeat units having from 1 to 20, preferably from 1 to 12, advantageously from 1 to 8, in particular from 1 to 4, carbon atoms in the alkyl radical and
c) from 0.0 to 8.0% by weight of styrenic repeat units of the general formula (I), where the percentages by weight give a total of 100.0% by weight.

According to one particularly preferred embodiment of the present invention, the (meth)acrylic polymer comprises, based on its total weight, at least 50.0% by weight, advantageously at least 60.0% by weight, preferably at least 75.0% by weight, in particular at least 85.0% by weight of methyl methacrylate repeat units.

The (meth)acrylic polymer moreover preferably has a number-average molecular weight in the range from 1000 to 100 000 000 g/mol, preferably in the range from 10 000 to 1 000 000 g/mol, in particular in the range from 50 000 to 500 000 g/mol. This molecular weight may be determined by gel permeation chromatography, for example, with calibration based on polystyrene.

Mixtures of this type may be prepared in various ways. For example, the dispersion of the core-shell particle may be mixed with an aqueous dispersion of the blend component, and the mixture may be coagulated, the aqueous phase separated off, and the coagulate melted to give a moulding composition. This process can achieve particularly homogeneous mixing of the two materials. The components may also be prepared separately and isolated and, in the form of their melts or in the form of powders or pellets, mixed and homogenized in a multiscrew extruder or on a roll mill.

Conventional additives may be admixed at any processing stage suitable for this purpose. These include dyes, pigments, fillers, reinforcing fibres, lubricants, UV stabilizers, etc.

For the purposes of one very particularly preferred embodiment of the present invention, the moulding composition comprises, based in each case on its total weight, from 0.1 to 10% by weight, preferably from 0.5 to 5.0% by weight, in particular from 1.0 to 4.0% by weight, of another polymer (AP) whose weight-average molecular weight is higher than that of the (meth)acrylic polymer by at least 10%, preferably at least 50%, in particular at least 100%. The molecular weight here may be determined by gel permeation chromatography, for example, with calibration based on polystyrene.

According to the invention, particularly suitable polymers (AP) preferably encompass, based in each case on their total weight,
a) from 50.0 to 100.0% by weight, advantageously from 60.0 to 100.0% by weight, particularly preferably from 75.0 to 100.0% by weight, in particular from 85.0 to 99.5% by weight, of alkyl methacrylate repeat units having from 1 to 20, preferably from 1 to 12, advantageously from 1 to 8, in particular from 1 to 4, carbon atoms in the alkyl radical,
b) from 0.0 to 40.0% by weight, preferably from 0.0 to 25.0% by weight, in particular from 0.1 to 15.0% by weight, of alkyl acrylate repeat units having from 1 to 20, preferably from 1 to 12, advantageously from 1 to 8, in particular from 1 to 4, carbon atoms in the alkyl radical and
c) from 0.0 to 8.0% by weight of styrenic repeat units of the general formula (I), where the percentages by weight give a total of 100.0% by weight.

In one particularly preferred embodiment of the present invention, the polymer (AP) comprises, based on its total weight, at least 50.0% by weight, advantageously at least 60.0% by weight, preferably at least 75.0% by weight, in particular at least 85.0% by weight of methyl methacrylate repeat units.

The polymer (AP) moreover preferably has a weight-average molecular weight in the range from 10 000 to 100 000 000 g/mol, preferably in the range from 50 000 to 5 000 000 g/mol, advantageously in the range from 100 000 to 1 000 000 g/mol, in particular in the range from 250 000 to 600 000 g/mol. This molecular weight may be determined for example by gel permeation chromatography with calibration based on polystyrene.

Blends of the core-shell particles, in particular with polymethyl methacrylate, are particularly suitable for producing mouldings, advantageously with a wall thickness above 1 mm, for example extruded webs of thickness of from 1 to 10 mm which give good results in a stamping process and can be used, for example, to produce printable panels for electrical devices, or for producing high-quality injection mouldings, e.g. motor vehicle windscreens. They can also be used to produce relatively thin films, for example of thickness 50 µm.

The mouldings obtainable according to the invention feature a preferred Vicat softening point to ISO 306 (B50) of at least 85° C., with preference at least 90° C. and with particular preference at least 93° C.

a preferred (Izod 180/1 eA) notched impact strength NIS to ISO 180 of at least 5.8 kJ/m², advantageously above 6.0 kJ/m², at 23° C., the preferred NIS at −20° C. being at least 3.7 kJ/m², and a preferred modulus of elasticity to ISO 527-2 of at least 1450 MPa.

For the purposes of one particularly preferred embodiment of the present invention, the mouldings of the invention are used as a mirror housing or a spoiler on a motor vehicle, as a pipe, as a film for sports items or as a protective covering or as a component of a refrigerator.

The following inventive examples and comparative examples serve for illustration of the present invention, but there is no intention that there be any resultant restriction of the concept of the invention.

I. Core-Shell Particles

A. Preparation of Seed Latex

A seed latex was prepared by emulsion polymerization of a monomer composition comprising 98% by weight of ethyl acrylate and 2% by weight of allyl methacrylate. The content of these particles in water was about 10% by weight, their diameter being about 20 nm.

B. Preparation of Core Shell Particles

All the core shell particles described below were prepared by emulsion polymerization according to the following general preparation instructions. The emulsions I to III as given in table 1 were used for this purpose.

19.416 kg of water were used to form an initial charge by stirring at 83° C. (internal vessel temperature) in a polymerization vessel. 16.2 g of sodium carbonate and 73 g of seed latex were added. Emulsion I was then metered in over a period of 1 h. 10 min after the end of the input of emulsion I, emulsion II was metered in over a period of about 2 h. Then, about 90 min after the end of input of emulsion II, emulsion III was metered in over a period of about 1 h. 30 min after the end of input of emulsion III, the mixture was cooled to 30° C.

To separate the core-shell particles, the dispersion was frozen at −20° C. for 2 d, then thawed again, and the coagulated dispersion was separated by way of a filter fabric. The solid was dried at 50° C. in a drying cabinet (duration: about 3 d).

The particle size of the core-shell particles (see table 2) was determined with the aid of a Coulter N4 device, these measurements being made on the particles in dispersion.

TABLE 1

| Composition of individual emulsions (all data in [g]) | | | | | |
|---|---|---|---|---|---|
| | VB1 | VB2 | B1 | B2 | B3 |
| Emulsion I | | | | | |
| Water | 8109.65 | 8109.65 | 8109.65 | 8109.65 | 8109.65 |
| Sodium persulfate | 8.24 | 8.24 | 8.24 | 8.24 | 8.24 |
| Aerosol OT 75 | 65.88 | 65.88 | 65.88 | 65.88 | 65.88 |
| Methyl methacrylate | 14216.72 | 14216.72 | 14216.72 | 14216.72 | 14216.72 |
| Ethyl acrylate | 593.6 | 593.6 | 593.6 | 593.6 | 593.6 |
| Allyl methacrylate | 29.68 | 29.68 | 29.68 | 29.68 | 29.68 |
| Emulsion II | | | | | |
| Water | 7081.18 | 7081.18 | 7081.18 | 7081.18 | 7081.18 |
| Sodium persulfate | 18.59 | 18.59 | 18.59 | 18.59 | 18.59 |
| Aerosol OT 75 | 84.71 | 84.71 | 84.71 | 84.71 | 84.71 |
| Butyl acrylate | 15454.8 | 18793.8 | 17839.8 | 17744.4 | 17649 |
| Styrene | 3453.48 | | 954 | 954 | 954 |
| Allyl methacrylate | 171.72 | 286.2 | 286.2 | 381.6 | 477 |
| Emulsion III | | | | | |
| Water | 2992.59 | 2992.59 | 2992.59 | 2992.59 | 2992.59 |
| Sodium persulfate | 8.24 | 8.24 | 8.24 | 8.24 | 8.24 |
| Aerosol OT 75 | 10.59 | 10.59 | 10.59 | 10.59 | 10.59 |
| Methyl methacrylate | 7632 | 7632 | 7632 | 7632 | 7632 |
| Ethyl acrylate | 848 | 848 | 848 | 848 | 848 |

II. Moulding Compositions

A. Blending of Moulding Compositions

A moulding composition based on polymethyl methacrylate, PLEXIGLAS® 7 N (Rohm GmbH & Co. KG, Darmstadt) was blended with the respective core-shell particles by means of an extruder. The compositions for the individual inventive examples and comparative examples are documented in table 2.

B. Testing of Moulding Compositions

Test specimens were produced from the blended moulding compositions. The moulding compositions and, respectively, the corresponding test specimens were tested according to the following measuring methods:

melt viscosity ηs (220° C./5 MPa): DIN 54811 (1984)
die swell B: DIN 54811 (1984)
Vicat softening point (16 h/80° C.) : DIN 1SO [sic] 306 (August 1994)
Izod notched impact strength: ISO 180 (1993)
Charpy notched impact strength: ISO 179 (1993)
modulus of elasticity: ISO 527-2

The results of the tests are likewise found in Table 2.

The advantages of the blends of the invention over the conventionally impact-modified moulding compositions (comparison A and B) are clearly seen:

⇒ At comparable content of the core-shell particles (<40% by weight), the notched impact strength of the moulding compositions of the invention at −20° C. is significantly higher than that of the comparative moulding compositions. All of the mixtures here have comparable notched impact strength at room temperature.

⇒ A tough phase with no styrene moreover gives no improvement in the low-temperature notched impact strength of these moulding compositions.

⇒ The good low-temperature notched impact strength is achieved without impairing the other important properties of the moulding compositions, in particular viscosity, Vicat softening point and modulus of elasticity.

⇒ When comparison is made with the moulding compositions disclosed in the patents DE 22 53 689, DE 41 21 652 and DE 41 36 993, a significantly smaller amount of core-shell particles is needed to achieve a comparable notched impact strength at low temperatures.

TABLE 2

Test results from impact-modified moulding compositions

| Blends | Comparison A | Comparison B | A | B | C |
|---|---|---|---|---|---|
| Core-shell particles | VB1 | VB2 | B1 | B2 | B3 |
| Particle radius [nm] | 190 | 168 | 190 | 176 | 178 |
| Content of core-shell particles in Plexiglas ® 7N [% by weight] | 38.4 | 38.4 | 38.6 | 38.8 | 39 |
| Viscosity ηs [Pa s] | 3210 | 3160 | 3510 | 3400 | 3850 |
| Die swell B [%] | 3.8 | 5 | 3.5 | 1.4 | 0.9 |
| Vicat softening point [° C.] | 95.6 | 96.9 | 98 | 98.5 | 98.3 |
| Izod notched impact strength | | | | | |
| 23° C.: [kJ/m²] | 6.2 | 3.8 | 6.4 | 6.4 | 6.4 |
| −10° C.: [kJ/m²] | 4.1 | | 4.6 | 4.8 | 4.7 |
| −20° C.: [kJ/m²] | 2.7 | 1.7 | 3.9 | 4.3 | 4.3 |
| Charpy notched impact strength | | | | | |
| 23° C.: [kJ/m²] | 7.4 | | 7.3 | 7.4 | 7.4 |
| −10° C.: [kJ/m²] | 3.9 | | 4.9 | 4.7 | 5.0 |
| −20° C.: [kJ/m²] | 2.9 | | 4.0 | 4.7 | 4.6 |
| Modulus of elasticity [MPa] | 1660 | | 1550 | 1620 | 1650 |

The invention claimed is:

1. A core-shell particle which has a core, a first shell and, optionally, a second shell, where:

i) the core comprises, based on its total weight, at least 75.0% by weight of (meth)acrylate repeat units;

ii) the first shell has a glass transition temperature below 30° C.;

iii) the second shell optionally comprises, based on its total weight, at least 75.0% by weight of (meth)acrylate repeat units; wherein iv) the first shell comprises, based on its total weight, the following constituents;

E) from 92.0 to 98.0% by weight of (meth)acrylate repeat units and

F) from 2.0 to 8.0% by weight of styrene repeat units of formula (I)

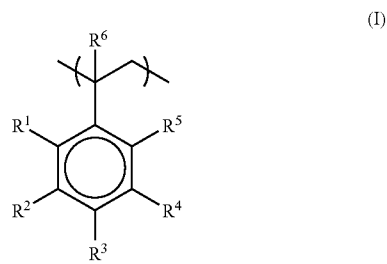

where each of the radicals $R^1$ to $R^5$, independently of the others, is hydrogen, a halogen, a $C_{1-6}$-alkyl group or a $C_{2-6}$-alkenyl group and the radical $R^6$ is hydrogen or an alkyl group having from 1 to 6 carbon atoms, where the percentages by weight of E) and F) give a total of 100.0% by weight, and in that v) the radius of the core-shell particle inclusive of any second shell present, measured by the Coulter method, is in the range from above 160.0 to 240.0 nm.

2. The core-shell particle according to claim 1, wherein, based in each case on its total weight, i) the proportion of the core is from 5.0 to 50.0% by weight, ii) the proportion of the first shell is from 20.0 to 75.0% by weight and iii) the proportion of the second shell is from 0.0 to 50.0% by weight, where the percentages by weight give a total of 100.0% by weight.

3. The core-shell particle according to claim 1, wherein the core comprises, based in each case on its total weight, A) from 50.0 to 99.9% by weight of alkyl methacrylate repeat units having from 1 to 20 carbon atoms in the alkyl radical, B) from 0.0 to 40.0% by weight of alkyl acrylate repeat units having from 1 to 20 carbon atoms in the alkyl radical, C) from 0.1 to 2.0% by weight, of crosslinking repeat units and D) from 0.0 to 8.0% by weight of styrene repeat units of the general formula (I), where the percentages by weight give a total of 100% by weight.

4. The core-shell particle according to claim 3, wherein the core comprises, based in each case on its total weight, from 80.0 to 99.9% by weight of methyl methacrylate repeat units and from 1.0 to 20.0% by weight of alkyl acrylate repeat units having from 1 to 4 carbon atoms in the alkyl radical, where the percentages by weight give a total of 100.0% by weight.

5. The core-shell particle according to claim 1, wherein the first shell comprises, based in each case on its total weight, E-1) from 90.0 to 97.9% by weight of alkyl acrylate repeat units having from 3 to 8 carbon atoms in the alkyl radical and/or alkyl methacrylate repeat units having from 7 to 14 carbon atoms in the alkyl radical, E-2) from 0.1 to 2.0% by weight of crosslinking repeat units and F) from 2.0 to 8.0% by weight of styrenic repeat units of formula (I), where the percentages by weight give a total of 100.0% by weight.

6. The core-shell particle according to claim 5, wherein the alkyl acrylate repeat units having from 3 to 8 carbon atoms in the alkyl radical and/or alkyl methacrylate repeat units having from 7 to 14 carbon atoms in the alkyl radical are butyl acrylate repeat units and/or dodecyl methacrylate repeat units.

7. The core-shell particle according to claim 1, wherein the core-shell particle has a second shell which, based in each case on its total weight, comprises
- G) from 50.0 to 100.0% by weight of alkyl methacrylate repeat units having from 1 to 20 carbon atoms in the alkyl radical,
- H) from 0.0 to 40.0% by weight of alkyl acrylate repeat units having from 1 to 20 carbon atoms in the alkyl radical and
- I) from 0.0 to 8.0% by weight of styrenic repeat units of formula (I), where the percentages by weight give a total of 100.0% by weight.

8. The core-shell particle according to claim 1, wherein the core has a glass transition temperature of at least 30° C.

9. The core-shell particle according to claim 1, wherein the core-shell particle has a second shell, which has a glass transition temperature of at least 30° C.

10. A process for preparing a core-shell particle according to claim 1, wherein comprises:

polymerizing the monomer of each stage of said core, first shell and second shell under multistage emulsion polymerization conditions.

* * * * *